United States Patent
Li et al.

(10) Patent No.: US 12,149,312 B2
(45) Date of Patent: Nov. 19, 2024

(54) SIGNAL TRANSMISSION METHOD AND COMMUNICATION APPARATUS

(71) Applicant: HUAWEI TECHNOLOGIES CO., LTD., Guangdong (CN)

(72) Inventors: Tie Li, Beijing (CN); Yongping Zhang, Beijing (CN); Xi Zhang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 56 days.

(21) Appl. No.: 17/855,605

(22) Filed: Jun. 30, 2022

(65) Prior Publication Data

US 2022/0337298 A1 Oct. 20, 2022

Related U.S. Application Data

(63) Continuation of application No. PCT/CN2019/130835, filed on Dec. 31, 2019.

(51) Int. Cl.
*H04B 7/06* (2006.01)

(52) U.S. Cl.
CPC ......... *H04B 7/0608* (2013.01); *H04B 7/0617* (2013.01)

(58) Field of Classification Search
CPC .... H04B 7/0608; H04B 7/0617; H04B 1/401; H04B 7/0695; H04B 7/088; H04B 7/0691
See application file for complete search history.

(56) References Cited

U.S. PATENT DOCUMENTS

| | | | |
|---|---|---|---|
| 2008/0009294 A1* | 1/2008 | Cho | H04W 72/23 455/451 |
| 2019/0007122 A1 | 1/2019 | Furuskog et al. | |
| 2019/0182898 A1 | 6/2019 | Yu et al. | |
| 2021/0051710 A1* | 2/2021 | Cirik | H04L 5/0053 |
| 2021/0307031 A1* | 9/2021 | Chen | H04L 5/0048 |
| 2022/0256509 A1* | 8/2022 | Lin | H04W 72/02 |
| 2022/0286170 A1* | 9/2022 | Flordelis | H04L 5/0096 |

FOREIGN PATENT DOCUMENTS

| | | |
|---|---|---|
| CN | 110537334 A | 12/2019 |
| CN | 110868231 A | 3/2020 |
| EP | 3820050 A1 | 5/2021 |
| WO | WO-2008115881 A1 * | 9/2008 ............. H01Q 1/243 |
| WO | 2019195528 A1 | 10/2019 |

OTHER PUBLICATIONS

Machine translation of CN-105723627-A (Year: 2023).*

(Continued)

*Primary Examiner* — Jean B Corrielus
(74) *Attorney, Agent, or Firm* — Fish & Richardson P.C.

(57) ABSTRACT

A signal transmission method provided in embodiments of the present invention may include the following steps: A network device sends configuration information to a terminal device, where the configuration information includes service periodicity information of an antenna panel. The terminal device activates, based on the configuration information, an antenna panel associated with the configuration information.

20 Claims, 4 Drawing Sheets

(56) References Cited

OTHER PUBLICATIONS

Huawei et al., "Enhancements on Multi-Beam Operation," 3GPP TSG RAN WG1 Meeting #95, R1-1812244, Spokane, USA, Nov. 12-16, 2018, 6 pages.
Nokia et al., "Remaining Issues on Beam Management," 3GPP TSG RAN WG1 Meeting #92bis, R1-1805104, Sanya, P.R. China, Apr. 16-20, 2018, 11 pages.
Office Action in Chinese Appln. No. 201980103352.0, dated Nov. 28, 2022, 7 pages.
Extended European Search Report in European Appln No. 19958547.2, dated Dec. 7, 2022, 8 pages.
International Search Report and Written Opinion in International Appln. No. PCT/CN2019/130835, mailed on Oct. 10, 2020, 17 pages (with English translation).

* cited by examiner

SIGNAL TRANSMISSION METHOD AND COMMUNICATION APPARATUS

CROSS-REFERENCE TO RELATED APPLICATIONS

This application is a continuation of international Application No. PCT/CN2019/130835, filed on Dec. 31, 2019, which is hereby incorporated by reference in its entirety.

TECHNICAL FIELD

This application relates to the wireless communication field, and more specifically, to a signal transmission method and a communication apparatus.

BACKGROUND

In some communication systems, for example, in a new radio access technology (new radio access technology, NR) of a fifth generation (5th generation, 5G) communication system, a transmit end and a receive end may separately obtain again by using beamforming (beamforming), to offset a path loss in a high frequency scenario. The transmit end and the receive end may send and receive a signal based on a predetermined beam pairing relationship.

Because beams have specific spatial directivity, a plurality of antenna panels (antenna panels) may be configured for a terminal device, to meet wide area coverage. The beams may be received or sent through the antenna panels. When the terminal device needs to switch a beam, the terminal device may first need to switch a panel, and then switch to a corresponding beam to send and receive a signal. However, it may take time for the terminal device to switch the panel. If the terminal device switches the panel after receiving scheduling signaling, a scheduled resource may arrive before the terminal device switches the panel. Consequently, a signal carried on the resource may not be successfully transmitted.

SUMMARY

This application provides a signal transmission method and a communication apparatus, to reduce a delay caused by panel switching, and improve transmission performance of a system.

According to a first aspect, a communication method is provided, including: A terminal device receives configuration information sent by a network device, where the configuration information includes service periodicity information of an antenna panel. The terminal device activates, based on the configuration information, an antenna panel associated with the configuration information.

With reference to the possible implementation of the first aspect, in a first possible implementation of the first aspect, the terminal device sends indication information, where the indication information includes one or more service periodicity candidates.

With reference to the first aspect and the first possible implementation of the first aspect, in a second possible implementation of the first aspect, the configuration information includes phase information in a service periodicity.

With reference to the first aspect and the first or second possible implementation of the first aspect, in a third possible implementation of the first aspect, the phase information indicates a number of phases included in the service periodicity, or the phase information indicates proportion information of a preset number of phases.

With reference to the first aspect and the first to third possible implementations of the first aspect, in a fourth possible implementation of the first aspect, the configuration information includes active number information, and the active number information indicates an active number of antenna panels activated in different phases.

With reference to the first aspect and the four possible implementations of the first aspect, in a fifth possible implementation of the first aspect, the periodicity information, the phase information, and the active number information are jointly indicated.

With reference to the first aspect and the first to fifth possible implementations of the first aspect, in a sixth possible implementation of the first aspect, the terminal device sends request information, where the configuration information responds to the request information.

With reference to the first aspect and the first to sixth possible implementations of the first aspect, in a seventh possible implementation of the first aspect, the configuration information is MAC-CE information or DCI information.

According to a second aspect, a communication method is provided, including:

A network device sends configuration information to a terminal device, where the configuration information includes service periodicity information of an antenna panel. The network device performs uplink or downlink data transmission with the terminal device.

With reference to the possible implementation of the second aspect, in a first possible implementation of the second aspect, the network device receives indication information, where the indication information includes one or more service periodicity candidates.

With reference to the second aspect and the first possible implementation of the second aspect, in a second possible implementation of the second aspect, the configuration information includes phase information in a service periodicity.

With reference to the second aspect and the first or second possible implementation of the second aspect, in a third possible implementation of the second aspect, the phase information indicates a number of phases included in the service periodicity, or the phase information indicates proportion information of a preset number of phases.

With reference to the second aspect and the first to third possible implementations of the second aspect, in a fourth possible implementation of the second aspect, the configuration information includes active number information, and the active number information indicates an active number of antenna panels activated in different phases.

With reference to the second aspect and the four possible implementations of the second aspect, in a fifth possible implementation of the second aspect, the periodicity information, the phase information, and the active number information are jointly indicated.

With reference to the second aspect and the first to fifth possible implementations of the second aspect, in a sixth possible implementation of the second aspect, request information sent by the terminal is received, where the configuration information responds to the request information.

With reference to the second aspect and the first to sixth possible implementations of the second aspect, in a seventh possible implementation of the second aspect, the configuration information is MAC-CE information or DCI information.

According to a third aspect, a communication apparatus is provided, including: a receiving unit, configured to receive configuration information sent by a network device, where the configuration information includes service periodicity information of an antenna panel; and an activation unit, configured to activate, based on the configuration information, an antenna panel associated with the configuration information.

With reference to the possible implementation of the third aspect, in a first possible implementation of the third aspect, the communication apparatus further includes a first sending unit, configured to send indication information, where the indication information includes one or more service periodicity candidates.

With reference to the third aspect and the first possible implementation of the third aspect, in a second possible implementation of the third aspect, the configuration information includes phase information in a service periodicity.

With reference to the third aspect and the first or second possible implementation of the third aspect, in a third possible implementation of the third aspect, the phase information indicates a number of phases included in the service periodicity, or the phase information indicates proportion information of a preset number of phases.

With reference to the third aspect and the first to third possible implementations of the third aspect, in a fourth possible implementation of the third aspect, the configuration information includes active number information, and the active number information indicates an active number of antenna panels activated in different phases.

With reference to the third aspect and the four possible implementations of the third aspect, in a fifth possible implementation of the third aspect, the periodicity information, the phase information, and the active number information are jointly indicated.

With reference to the third aspect and the first to fifth possible implementations of the third aspect, in a sixth possible implementation of the third aspect, the communication apparatus further includes a second sending unit, configured to send request information, where the configuration information responds to the request information.

With reference to the third aspect and the first to sixth possible implementations of the third aspect, in a seventh possible implementation of the third aspect, the configuration information is MAC-CE information or DCI information.

According to a fourth aspect, a communication apparatus is provided, including: a sending unit, configured to send configuration information to a terminal device, where the configuration information includes service periodicity information of an antenna panel; and a determining unit, configured to determine the configuration information.

With reference to the possible implementation of the fourth aspect, in a first possible implementation of the fourth aspect, the apparatus further includes:

a first receiving unit, configured to receive indication information, where the indication information includes one or more service periodicity candidates.

With reference to the fourth aspect and the first possible implementation of the fourth aspect, in a second possible implementation of the fourth aspect, the configuration information includes phase information in a service periodicity.

With reference to the fourth aspect and the first or second possible implementation of the fourth aspect, in a third possible implementation of the fourth aspect, the phase information indicates a number of phases included in the service periodicity, or the phase information indicates proportion information of a preset number of phases.

With reference to the fourth aspect and the first to third possible implementations of the fourth aspect, in a fourth possible implementation of the fourth aspect, the configuration information includes active number information, and the active number information indicates an active number of antenna panels activated in different phases.

With reference to the fourth aspect and the four possible implementations of the fourth aspect, in a fifth possible implementation of the fourth aspect, the periodicity information, the phase information, and the active number information are jointly indicated.

With reference to the fourth aspect and the first to fifth possible implementations of the fourth aspect, in a sixth possible implementation of the fourth aspect, the apparatus further includes:

a second receiving unit, configured to receive request information sent by the terminal device, where the configuration information responds to the request information.

With reference to the fourth aspect and the first to sixth possible implementations of the fourth aspect, in a seventh possible implementation of the fourth aspect, the configuration information is MAC-CE information or DCI information.

According to embodiments of this application, when complexity, power consumption, and heat dissipation of the terminal are acceptable, a solution of using both single-antenna panel transmission and multi-antenna panel transmission can be used, to improve system efficiency.

DESCRIPTION OF EMBODIMENTS

The following describes technical solutions of this application with reference to the accompanying drawings.

The technical solutions in embodiments of this application may be applied to various communication systems, for example, a global system for mobile communications (Global System for Mobile communications, GSM), a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD) system, a universal mobile telecommunications system (Universal Mobile Telecommunications System, UMTS), a worldwide interoperability for microwave access (Worldwide Interoperability for Microwave Access, WiMAX) communication system, a future fifth generation (5th Generation, 5G) communication system or a new radio access technology (new radio Access Technology, NR), and beyond 5G or a 6G radio access technology.

Figure 1:
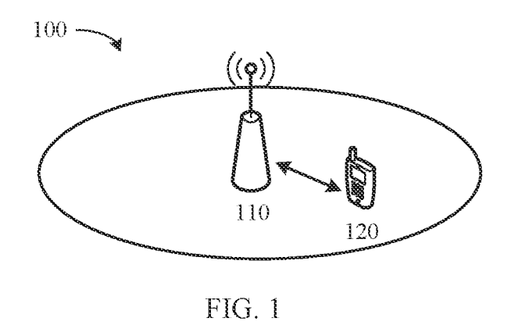
FIG. 1 is a schematic diagram of a communication system to which a sending and receiving method and apparatus are applicable according to an embodiment of this application.

To facilitate understanding of embodiments of this application, a communication system to which embodiments of this application are applicable is first described in detail with reference to FIG. 1. FIG. 1 is a schematic diagram of a communication system to which a sending and receiving method and apparatus are applicable according to an embodiment of this application. As shown in FIG. 1, the communication system 100 may include at least one network device, for example, a network device 110 shown in FIG. 1. The communication system 100 may further include at least one terminal device, for example, a terminal device 120 shown in FIG. 1. The network device 110 may communicate with the terminal device 120 through a radio link. A plurality of antennas may be configured for each communication device such as the network device 110 or the terminal device 120. The plurality of antennas may include at least one transmit antenna configured to send a signal and at least one receive antenna configured to receive a signal. In addition, the communication device further additionally includes a transmitter chain and a receiver chain. A person of ordinary skill in the art may understand that the transmitter chain and the receiver chain each may include a plurality of components (for example, a processor, a modulator, a multiplexer, a demodulator, a demultiplexer, or an antenna) related to signal sending and receiving. Therefore, the network device 110 may communicate with the terminal device 120 by using a multi-antenna technology.

It should be understood that the network device in the wireless communication system may be any device that has wireless receiving and sending functions. The device includes but is not limited to: an evolved Node B (evolved Node B, eNB), a radio network controller (Radio Network Controller, RNC), a Node B (Node B, NB), a base station controller (Base Station Controller, BSC), a base transceiver station (Base Transceiver Station, BTS), a home base station (for example, a Home evolved NodeB, or a Home Node B, HNB), a baseband unit (BaseBand Unit, BBU), an access point (Access Point, AP) in a wireless fidelity (Wireless Fidelity, WIFI) system, a wireless relay node, a wireless backhaul node, a transmission point (transmission point, TP), a transmission and reception point (transmission and reception point, TRP), or the like. The device may alternatively be a gNB or a transmission point (TRP or TP) in a 5G system, for example, an NR system, or one or a group (including a plurality of antenna panels) of antenna panels of a base station in the 5G system. The device may alternatively be a network node that constitutes a gNB or a transmission point, for example, a baseband unit (BBU) or a distributed unit (distributed unit, DU).

In some deployments, the gNB may include a centralized unit (centralized unit, CU) and a DU. The gNB may further include a radio unit (radio unit, RU). The CU implements some functions of the gNB, and the DU implements some functions of the gNB. For example, the CU implements functions of a radio resource control (radio resource control, RRC) layer and a packet data convergence protocol (packet data convergence protocol, PDCP) layer; and the DU implements functions of a radio link control (radio link control, RLC) layer, a media access control (media access control, MAC) layer, and a physical (physical, PHY) layer. Information at the RRC layer is eventually converted into information at the PHY layer, or is converted from information at the PHY layer. Therefore, in this architecture, higher layer signaling such as RRC layer signaling may also be construed as being sent by the DU or sent by the DU and the CU. It can be understood that the network device may be a CU node, a DU node, or a device including the CU node and the DU node. In addition, the CU may be a network device in an access network (radio access network, RAN), or may be a network device in a core network (core network, CN). This is not limited in this application.

It should be further understood that the terminal device in the wireless communication system may also be referred to as user equipment (user equipment, UE), an access terminal, a subscriber unit, a subscriber station, a mobile station, a remote station, a remote terminal, a mobile device, a user terminal, a terminal, a wireless communication device, a user agent, or a user apparatus. The terminal device in embodiments of this application may be a mobile phone (mobile phone), a tablet computer (pad), a computer with wireless receiving and sending functions, a virtual reality (virtual reality, VR) terminal device, an augmented reality (augmented reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like. An application scenario is not limited in embodiments of this application.

For ease of understanding embodiments of this application, the belongings involved in this application are first briefly described.

1. A beam may be understood as a spatial filter (spatial filter) or a spatial parameter (spatial parameters). A beam used to send a signal may be referred to as a transmit beam (transmit beam, Tx beam), and may be a spatial transmit filter (spatial domain transmit filter) or a spatial transmit parameter (spatial transmit parameters, spatial Tx parameters). A beam used to receive a signal may be referred to as a receive beam (receive beam, Rx beam), and may be a spatial receive filter (spatial domain receive filter) or a spatial receive parameter (spatial receive parameters, spatial Rx parameters).

A technology for forming the beam may be a beamforming technology or another technology. For example, the beamforming technology may be specifically a digital beamforming technology, an analog beamforming technology, a hybrid digital/analog beamforming technology, or the like. The transmit beam may refer to signal strength distribution formed in different directions in space after a signal is transmitted through an antenna, and the receive beam may refer to signal strength distribution in different directions in space of a radio signal received from an antenna.

In an NR protocol, the beam may be, for example, a spatial filter (spatial filter). However, it should be understood that this application does not exclude a possibility that another term is defined in a future protocol to represent a same or similar meaning.

2. Antenna panel is referred to as a panel (panel) for short. Each antenna panel may be configured with one or more receive beams and one or more transmit beams. Therefore, the antenna panel may also be understood as a beam group. A communication device, for example, a terminal device or a network device, may receive a signal by using a receive beam on an antenna panel, or may transmit a signal by using a transmit beam on the antenna panel.

In an NR standard discussion process, the antenna panel may also be construed as a logical entity including a plurality of physical antenna mappings.

In embodiments of this application, the panel may be distinguished by, for example, a resource of an uplink reference signal. The uplink reference signal may be, for example, a sounding reference signal (sounding reference signal, SRS). As an example rather than a limitation, one antenna panel may correspond to one SRS resource set (resource set) identifier (identifier, ID). In other words, one SRS resource set ID may be used to indicate one panel.

The panel may alternatively be distinguished by a panel ID. For example, the panel ID may be indicated by a transmission configuration indicator (transmission configuration indicator, TCI).

When a network device schedules, by using scheduling signaling, a resource for a terminal device to transmit a signal, a receive beam or a transmit beam of the terminal device may be indicated by using the scheduling signaling. The terminal device may determine, based on the receive beam or the transmit beam indicated in the scheduling signaling, whether to switch a panel. However, it takes 2 to 3 milliseconds (ms) for the terminal device to switch the panel. However, a panel to which the terminal device needs to switch may be in a deactivated state, and the panel needs to be activated and then switched to. It may take much longer time to activate the panel than to switch to the panel. For the network device, a small scheduling delay interval may be used when the terminal panel is activated. Because the network device is unaware of a state of the panel of the terminal device, an interval between a time at which the network device sends the scheduling signaling and a time at which a resource is scheduled may not be sufficient to enable the terminal device to complete panel activation and switching. If the resource scheduled by the network device arrives before the terminal device completes the panel switching, a signal transmitted on the resource cannot be received or sent in time.

Specifically, if the resource is used for uplink transmission, because the terminal device has not completed panel switching, the terminal device cannot send an uplink signal or an uplink channel by using a transmit beam on the panel. Consequently, the scheduled resource may be wasted, and more resources may need to be scheduled for the uplink transmission due to insufficient resources. This results in a large transmission delay.

If the resource is used for downlink transmission, because the terminal device has not completed panel switching, the terminal device cannot receive a downlink signal or a downlink channel by using a receive beam on the panel. Consequently, the downlink signal or the downlink channel transmitted on the scheduled resource may not be completely received, and the downlink signal or the downlink channel may need to be successfully received in a manner such as retransmission. This results in a large transmission delay and low resource utilization.

In view of this, this application provides a signal transmission method, to avoid a delay caused by panel activation. This helps improve transmission performance of a system.

It should be noted that, in some cases, panel activation and panel switching are collectively referred to as panel switching, and a panel activation delay and a panel switching delay are denoted as a panel switching delay. This application does not preclude such an understanding. Embodiments shown below describe panel activation and panel switching as two separate concepts for ease of understanding. This shall not constitute any limitation on this application.

Before the method provided in embodiments of this application is described, the following descriptions are first provided.

First, in embodiments of this application, an "indication" may include a direct indication and an indirect indication, or may include an explicit indication and an implicit indication. Information indicated by specific information (configuration information in the following descriptions) is referred to as to-be-indicated information. In a specific implementation process, the to-be-indicated information may be indicated in a plurality of manners, for example, but not limited to, directly indicating the to-be-indicated information, for example, the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already known or pre-agreed on. For example, specific information may alternatively be indicated by using an arrangement sequence of a plurality of pieces of information that is pre-agreed on (for example, stipulated in a protocol), to reduce indication overheads to some extent.

Second, in embodiments shown below, terms and English abbreviations, for example, downlink control information (DCI), a medium access control control element (MAC-CE), radio resource control (RRC), a physical downlink control channel (physical downlink control channel, PDCCH), a physical downlink shared channel (physical downlink shared channel, PDSCH), a physical uplink control channel (physical uplink control channel, PUCCH), and a physical uplink shared channel (physical uplink shared channel, PUSCH), a control resource set (control resource set, CORESET), a channel state information reference signal (CSI-RS), a sounding reference signal (SRS), a synchronization signal/physical broadcast channel (SS/PBCH), a synchronization signal block (SSB), and a transmission configuration indicator (TCI), are all examples provided for ease of description, and shall not constitute any limitation on this application. This application does not exclude a possibility of defining another term that can implement a same or similar function in an existing or a future protocol.

Third, "first", "second", and various numbers in embodiments shown below are merely used for differentiation for ease of description, and are not intended to limit the scope of embodiments of this application. For example, different indication information, different beams, and different panels are distinguished.

Fourth, in embodiments below, "obtained in advance" may include indication over signaling of a network device, or pre-definition such as a protocol definition. "Pre-definition" may be implemented by prestoring corresponding code or a corresponding table in a device (for example, including the terminal device and the network device), or in another manner that may be used to indicate related information. A specific implementation is not limited in this application.

Fifth, "save" in embodiments of this application may be storage in one or more memories. The one or more memories may be separately disposed, or may be integrated into an encoder, a translator, a processor, or a communication apparatus. Alternatively, a part of the one or more memories may be separately disposed, and a part of the one or more memories are integrated into a translator, a processor, or a communication apparatus. A type of the memory may be a storage medium in any form, and this is not limited in this application.

Sixth, a "protocol" in embodiments of this application may refer to a standard protocol in the communication field. For example, the "protocol" may include an LTE protocol, an NR protocol, and a related protocol applied to a future communication system. This is not limited in this application.

Seventh, "at least one" means one or more, and "a plurality of" means two or more. The term "and/or" describes an association relationship for describing associated objects and represents that three relationships may exist. For example, A and/or B may indicate the following cases: Only A exists, both A and B exist, and only B exists, where A and B may be singular or plural. The character "/" usually indicates an "or" relationship between the associated objects. "At least one item (piece) of the following" or a similar expression thereof indicates any combination of these items, including any combination of singular items (pieces) plural items (pieces). For example, at least one of a, b, and c may indicate a, b, c, a and b, a and c, b and c, or a, b, and c, where a, b, or c may be singular or plural.

Eighth, resource arrival of the signal or the channel mentioned in embodiments of this application may be specifically a time at which the signal or the channel starts to be sent, or a time at which the signal or the channel starts to be received.

The following describes in detail a signal transmission method and an apparatus provided in this application with reference to the accompanying drawings.

It should be understood that the technical solutions in this application may be applied to a wireless communication system, for example, the communication system 100 shown in FIG. 1. There may be a wireless communication connection relationship between two communication apparatuses in the wireless communication system. One of the two communication apparatuses may correspond to the terminal device 120 shown in FIG. 1, for example, may be the terminal device shown in FIG. 1, or may be a chip configured in the terminal device. The other communication apparatus in the two communication apparatuses ma correspond to the network device 110 shown in FIG. 1, for example, may be the network device shown in FIG. 1, or may be a chip configured in the network device.

Without loss of generality, the following describes in detail the signal transmission method provided in embodiments of this application by using an interaction process between a terminal device and a network device as an example. For ease of understanding, the following separately describes the method provided in embodiments of this application by using an uplink and a downlink as examples.

Figure 2:
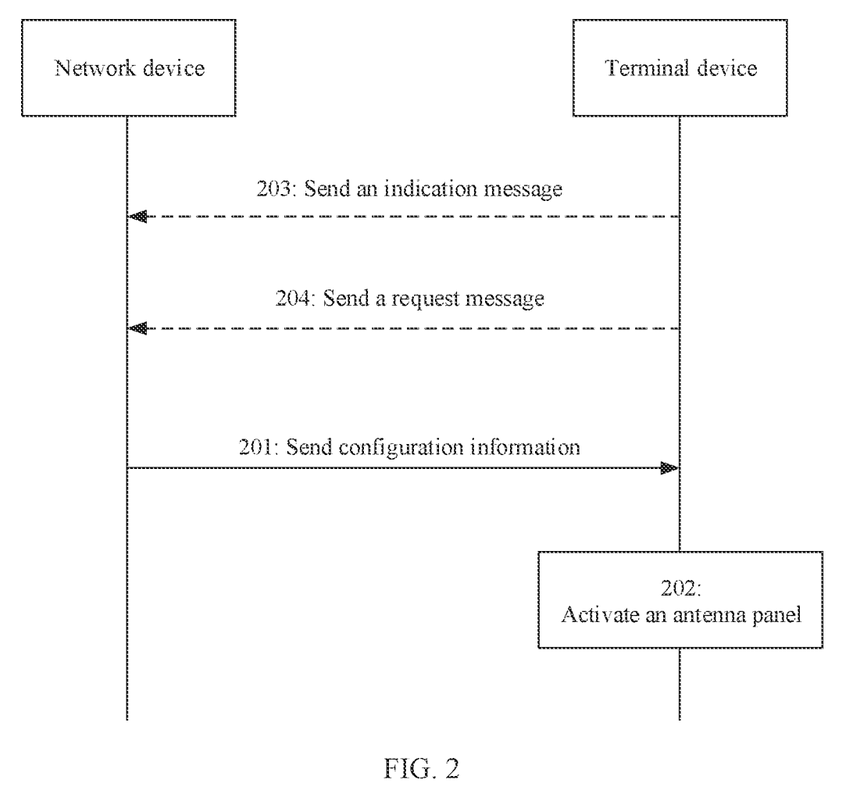
FIG. 2 is a schematic flowchart of a signal transmission method according to an embodiment of this application.

FIG. 2 is a schematic flowchart of a signal transmission method 200 according to an embodiment of this application from a perspective of device interaction. Specifically, FIG. 2 shows a downlink signal or downlink channel transmission method. As shown in the figure, the method 200 shown in FIG. 2 may include step 201 to step 204. The following describes the method 200 in detail with reference to the accompanying drawing.

Step 201: A network device sends configuration information to a terminal device, where the configuration information includes service periodicity information of an antenna panel.

In an embodiment, the network device may be a base station, an entity in a core network, or another network side device. In some architectures, the network device may be a primary base station, a secondary base station, or a terminal device in a terminal-to-terminal scenario.

The configuration information may be a piece of signaling, or may refer to an information element. The service periodicity information (T) of the antenna panel may be a parameter of an overall periodicity. In an embodiment, the periodicity information may be length information of one periodicity in units of various types, for example, 1024 ms or a length of several slots. It should be understood that the information parameter does not necessarily directly indicate a specific number of 1024, and may be a plurality of pieces of length level information. For example, it is specified that there are 12 values 0, 1, 2, . . . , and 11 in total, and the terminal device and the network device pre-specify that the value 11 represents 1024 ms. In this case, when the network device delivers the values through signaling, the terminal may determine a specific service periodicity of the antenna panel based on the values. In this application, a start location (a slot, subframe, symbol, time, or the like) of the antenna panel is defined as a function including one or more parameters of an SFN, slot, subframe, symbol, time, service periodicity, phase number, active number, and proportion.

The periodicity information is notified of in an explicit manner, or may be obtained in an implicit manner. For example, the periodicity information is directly determined based on a value of another parameter. For example, the service periodicity information of the antenna panel is determined based on a preset association relationship between a service periodicity and values of a waveform parameter, a BWP parameter and the like, or a periodicity parameter of another function if these parameters are configured.

In an embodiment, the configuration information includes phase information (L) in the service periodicity. Generally, one service periodicity of the antenna panel may include one or more phases. The phase information may be set by default on a system. For example, a number of phases are fixed at two, or may be flexible and variable. In an embodiment, for the terminal device, the number of phases may be set. For example, the phase information indicates a number of phases included in the service periodicity. When the number of phases is set to 1, one periodicity includes only one phase. When the number of phases is set to a value greater than 1, one periodicity includes more than one phase. Two phases are used as an example. When the number of phases is set to 2, one periodicity may include two phases. For ease of description, a phase that is chronologically earlier is named as a phase 1, and a phase that is chronologically later is named as a phase 2.

When a length of a specific phase is not configured, the phase 1 and the phase 2 may use a default time occupation (Occupation), that is, the phase information indicates proportion information of a preset number of phases. For example, when the service periodicity is fixed/determined, periods of time occupied by the first phase and the second phase are the same by default, or in a default occupation of x, for example, 2:1. Alternatively, the phase 1 occupies a units of time, and the phase 2 occupies b units of time. The unit of time herein may be a ms, slot, or the like, and this is not limited herein. In an embodiment, the proportion information may be set together with the phase information as a parameter of the phase information, or may be separately set. It should be noted that a manner of notifying the time occupation herein may alternatively be based on indexes corresponding to different occupations. For example, 19:1 corresponds to an index 0, and 9:1 corresponds to an index 1.

It should be understood that the two phases are still used as an example. The "phases" herein may refer to two time intervals, and active numbers of antenna panels are different in the two time intervals. Certainly, in other cases, the active numbers of two antenna panels may be the same, and other parameters may be different. The two phases are still used as an example. An antenna panel activated in the phase 1 is an antenna panel in a set A, and an antenna panel activated in the phase 2 is an antenna panel in a set B. The set A and the set B may have no intersection, or may have a partial intersection. In a case of configuration, the set A or set B may be configured or predefined, to constrain activation of antenna panels, and adapt to various scenarios. In another embodiment, antenna panel-related configuration parameters in the two time intervals are different. It should be understood that the phase information may alternatively be used as an individual embodiment. To be specific, the configuration information may not include the periodicity information, but is a piece of service information. The periodicity information is stored or pre-initialized and configured on a network device side and a terminal device side as a preset or configured value.

Figure 8:
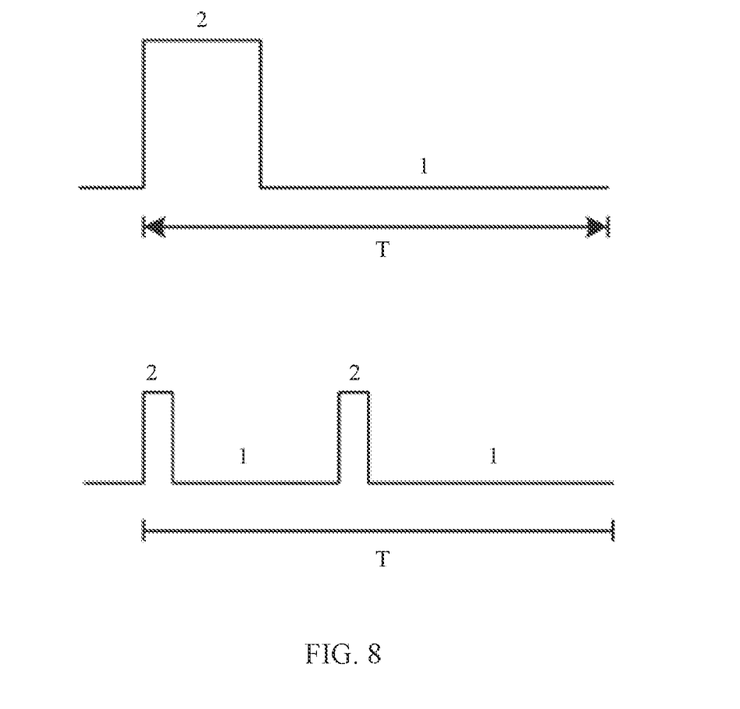
FIG. 8 is a schematic diagram of a discrete phase case according to this application.

In an embodiment, the antenna panels may be "phase-discrete". To be specific, phases in which a same number of panels are activated may be construed as being in one phase. For example, in two cases shown in FIG. 8, a proportion of activated two panels is the same as that of activated one panel. It is considered that two phases or four phases may be defined according to different circumstances.

In still another embodiment, the configuration information includes active number information (Active Number). The active number information may be construed as one type of phase information, and indicate an active number of antenna panels activated in different phases. It should be understood that the notified active number may be a maximum active number in each phase, a phase, or an entire periodicity, or a number of antenna panels activated in each phase, a phase, or an entire periodicity, or a number of antenna panels that should be activated at least in each phase, a phase, or an entire periodicity, or a combination of the situations. The embodiment of the two phases is still used as an example, the configuration information indicates that a number of antenna panels activated in the phase 1 is K1, and that a number of antenna panels activated in the phase 2 is K2. It should be understood that this embodiment may be separated from the foregoing embodiment. To be specific, the configuration information includes only the periodicity information, but not the phase information. Alternatively, the configuration information and the periodicity information may not be included, and only the active number information is indicated. In these cases, the periodicity information or the configuration information may be a default value or a configured value. For example, a default number of phases on a system is 1. To be specific, there is no difference between a number of antenna panels activated in a periodicity and a configured parameter, or there is no concept of phases. In this case, if the active number information corresponds to K, the active number of antenna panels in one periodicity is K. For another example, if the default number of phases on the system is 3, by default, notified numbers of panels activated in the three phases of one periodicity may be notified of as K0, K1, and K2 in a chronological order, or based on a default field arrangement. Certainly, similar to the foregoing embodiments, a set may be directly notified to notify an open panel. For example, the phase 1 is the set A, specifically {panel 0, panel 1}, and the phase 2 is the set B, specifically {panel 1, panel 2, panel 3}. An advantage of having an intersection is that a panel can be kept working, and system continuity is better. Certainly, there may alternatively be no intersection. It should be understood that a manner of configuring the set herein is similar to a manner of activating the panel. The configured set may be panels that are configured for the terminal device and that may be selected for activation. In other words, the terminal device may determine, based on a load of the terminal device or another condition, to activate a part of the panels. Alternatively, the configured set may be a configured panel that the terminal device may be directly specified to open. In other words, the panel activated by the terminal device is the same as the panel in the set.

It should be understood that, if all the information needs to be configured, the information may be in a same piece of configuration information, in a plurality of pieces of configuration information, or in a plurality of information elements of one piece of configuration information. The periodicity information, the phase information, or the active number of active antenna panels may alternatively be configured in different manners such as a semi-static or a static manner. Details are not described herein again.

All the information may be indicated in a joint indication manner. In still another embodiment, in some cases in which numbers of antenna panels activated in all phases are the same, only one number may be notified of, to configure the numbers of antenna panels activated in all phases. Similar descriptions have been provided in the foregoing descriptions. For example, when the phase information is a notified index of 19:1, it is notified that two phases are included. A first phase occupies 19/20 of a periodicity, and a second phase occupies 1/20 of the periodicity. In another example, when the periodicity information, the phase information, the active number, and the active panel index need to be configured at the same time, a rule may be designed based on a correspondence shown in the following table, and configuration is performed.

| Identifier | Periodicity information (ms) | Phase information (Number of phases) | Phase information (Occupation) | Active number (Number of TRBs) | Active panel index |
|---|---|---|---|---|---|
| 0 | 20 | 2 | 19:1 | [1, 2] | ([Panel 1], [Panel 1, Panel 2]) |
| 1 | 20 | 2 | 9:1 | [1, 2] | ([Panel 1], [Panel 1, Panel 2]) |
| 2 | 40 | 2 | 3:1 | [1, 2] | ([Panel 1], [Panel 1, Panel 2]) |
| 3 | 40 | 3 | 30:2:8 | [1, 3, 2] | ([Panel 1], [Panel 1, Panel 2, Panel 3], [Panel 1, Panel 2]) |

In examples in the table, a request notifies of an index 0, indicating periodicity information, phase information and an active number that correspond to the index 0 are notified of together. The terminal device and/or the network side device may separately store the correspondences in a memory or a storage medium. It should be understood that only some rows or columns in the table may be used in actual application, for example, a table that removes the phase information (number of phases) may also be applied to this application. In the table, [1, 3, 2] means that an active number of a phase 1 is 1, an active number of a phase 2 is 3, and an active number of a phase 3 is 2. The present invention does not limit a specific manner of notifying the parameters. For example, the active panel index may be notified of in a form of a bitmap (bitmap). It should be understood that, the table is for ease of description. The terminal device and the network device side may store the table in an array form, or store an association relationship between the parameters in a correspondence manner.

It should be understood that a number of panels may not be directly indicated by a serial number of a panel. Alternatively, a corresponding panel may be configured by configuring other information. For example, an antenna port is associated with a panel, and the panel is configured by configuring the antenna port. Alternatively, an antenna panel is configured by configuring a beam based on a relationship between the beam and the panel. It should be understood that, in step 201, the periodicity information may alternatively not be included in the configuration information, and the configuration information may include one or more of the periodicity information, the phase information, and the active number.

It should be understood that parameters have an association relationship in some cases. Therefore, when the terminal device and/or the network device store the association relationship, the network device may configure a part of the parameters, and the terminal determines other configuration information based on the association relationship. For example, the network device configures an active number x on the terminal device. If the active number x is associated with a periodicity parameter α, a duration parameter β, and a start offset δ, the terminal may obtain information to determine a specific activation manner. For example, the periodicity parameter is 10 ms, the duration parameter is 1 ms, and the start location offset is +5 ms. In this case, the terminal may confirm that a periodicity T of the terminal is 10 ms, and that two antenna panels are activated at a 6th ms of 10 ms for 1 ms. It should be understood that, if a part of parameters in the example are not related to the active number, the part of parameters need to be preset or separately configured. For example, the network device configures an active number y on the terminal device, and y is associated with the periodicity parameter α and the duration parameter β. In this case, a base station needs to configure the active number and the start location offset. For example, the base station sets the active number to 3, and the number 3 of active panels is associated with the timing parameter 5 ms and the periodicity parameter 20 ms. In this case, when determining that the offset is +14 ms, the base station may activate three antenna panels in a sending interval of 15th ms to 19th ms of the periodicity 20 ms (counting starts from 0th ms). It should be understood that the foregoing embodiment is merely an example, and may be another combination manner. For example, x is associated with ß, and another parameter needs to be configured; or x is associated with β, and α is associated with δ.

In an embodiment, the configuration information is media access control control element (MAC CE) MAC control element information. In another embodiment, the configuration information is downlink control information (DCI) downlink control information or radio resource control (RRC) radio resource control signaling. Different signaling may be used for different information. For example, the DCI may notify of all or a part of the periodicity information, the phase information, and the active number of panels, and the MAC or RRC radio resource control signaling may notify of a remaining part. In an embodiment, the RRC notifies of all parameters and candidate values. The MAC-CE further selects and notifies of one parameter, a part of parameters, or all parameters, and one or more candidate values of the corresponding parameters from the RRC notification. The DCI further selects and notifies of one parameter, a part of parameters, or all parameters, and one or more candidate values of the corresponding parameters from the RRC notification or MAC-CE notification.

Step 202: The terminal device activates, based on the configuration information, an antenna panel associated with the configuration information.

In an embodiment, the terminal activates, based on the periodicity information, an antenna panel associated with the periodicity information. It should be understood that, according to the several implementations described in step 201, when the configuration information includes other pieces of information, the terminal activates, based on the configured periodicity information, phase information, and active number information, a configuration panel associated with the configuration information. Certainly, activation may alternatively be performed directly based on a corresponding index. The activation herein may mean activation in a broad sense, and it should also be understood as activation when a panel has been previously activated and needs to remain in an active state.

The implementation can implement flexible scheduling modes, and can be applicable to various antenna switching scenarios when a specific combination is configured, to optimize system performance.

The following continues to describe an implementation suitable for the present invention with reference to the foregoing embodiments.

In an implementation, before step 201, the method further includes step 203: The terminal device sends indication information to the network device, where the indication information includes one or more service periodicity candidates. The one or more service periodicity candidates may be a set of periodicity parameters supported by a plurality of terminal devices or the terminal device, or may be a plurality of service periodicity candidates selected as needed based on a condition. Optionally, the network device prestores corresponding information about the terminal device, determines a corresponding periodicity and another parameter based on the indication information, and then configures the terminal device. For example, available periodicities are {T0, T1 T2, T3, T4, T5, T6, T7} in total. The terminal reports four candidates {T4, T5, T6, T7} based on conditions such as a condition or a capability of the terminal to indicate supported candidate values; or may report one candidate {T4} to indicate a supported maximum candidate value. In this way, the service periodicity candidate may be notified to the network device for reference or constraint. Before performing step 201, the network device may perform a configuration constraint based on the candidate. For example, the periodicity information included in the configuration information is a subset or a true subset of the foregoing candidates, to achieve effective configuration. It should be understood that the network device may not refer to candidate information. Alternatively, the network device configures at least one value from the candidate values, and configure another value.

It should be understood that it is only an optional solution that the indication information reported by the terminal includes one or more service periodicity candidates. With reference to the foregoing embodiments, the terminal device may further send a candidate of the phase information or send a candidate of the active number by using the indication information. The candidate information may be indicated by using one piece of information, or may be indicated jointly. For example, a plurality of sets are directly reported in one information element, and one set includes one type of candidate. For another example, a plurality of candidate values are reported, and a value represents one of a plurality of combination manners of the foregoing parameters. The candidate value herein may be directly scenario information or another parameter, and the scenario information or another parameter is associated with a parameter combination manner. In still another embodiment, the terminal may report a capability of the terminal in an implicit or explicit manner, and the network device may perform the subsequent step 201 based on the capability information. A manner of reporting the capability can save downlink resources, and help the network device accurately select a suitable configuration to perform step 201.

In still another embodiment, before step 201, the method further includes step 204: The terminal device sends a request message to the network device, where the request message triggers the network device to send the configuration information, and trigger of the request message may be implicit. For example, the request message is a piece of preset signaling, and the network device performs step 201 after receiving the configuration signaling. The request message in step 204 and the indication information in step 203 may be one message, or may be two separate steps. If step 204 and step 203 are two different messages, a sequence of step 204 and step 203 may be determined by a system design. For example, in an initialization phase or an initial access phase, the terminal device has reported capability information, and the capability information is associated with a periodicity candidate or another parameter candidate, in this case, step 203 is performed before step 204.

The following provides an example embodiment for a specific configuration in the foregoing solutions. It should be understood that, in actual application, the configuration may be different from the following solutions, or may be a part of parameter configurations in the following solutions. For example, a number of phases may be set to 2 by default, or be reported by the terminal.

Embodiment 1

Periodicity information may be a maximum value, and the maximum value may be defined as a search space monitor occasion periodicity (search space monitor occasion periodicity), or a maximum allowed periodicity. A number of phases is set to L=2, a proportion of a phase 1 is 5% (percentage), a proportion of a phase 2 is 95%, a number of panels activated in the phase 1 is 2, and a number of panels activated in the phase 2 is 1. In an embodiment, a number of panels actually activated in the phase 1 and the phase 2 may be greater than a configured number.

Embodiment 2

Periodicity information may be a maximum value, and the maximum value may be defined as a search space monitor occasion periodicity (search space monitor occasion periodicity), or a maximum allowed periodicity. A number of phases is set to L=2, a proportion of a phase 1 is overlapping coverage area/coverage area of one cell, a proportion of a phase 2 is non-overlapping coverage area/coverage area of the cell, a number of panels activated in the phase 1 is 2, and a number of panels activated in the phase 2 is 1. Herein, the parameter overlapping coverage area/coverage area of one cell may be calculated based on a specific value or a level identifier, or may be directly configured for a terminal device after a network device determines a proportion. A specific determining manner may be: determining whether signal quality of a plurality of cells meets a condition of the overlapping coverage area. If an area meets the condition, the area is an overlapping coverage area. If an area does not meet the condition, the area is a non-overlapping coverage area. It should be understood that there may be a plurality of definitions of the overlapping coverage area and the coverage area of one cell herein. For example, an expression $L/D=(2\times R)/D-1$ may be used with a cell radius and a distance between two cells, that is, the proportion is 2×cell radius/distance between two cells−1.

Embodiment 3

A terminal may report periodicity information and a number of phases and/an occupation in phase information. When the reported number of phases is 3, or the reported occupation implicitly indicates 3 phases, a number of phases activated in a phase 1 is 1, a number of phases activated in a phase 2 is 3, and a number of phases activated in a phase 3 is 2.

Embodiment 4 in the embodiment 4, the foregoing parameters may be configured based on other configuration parameters. For example, a maxUplinkDutyCycle field is used, and periodicity information T is set to a period of time (for example, 1 second), and a configured transmission proportion is one of the following parameters {1%, 5%, 10%, 15%, 20%, . . . }. Alternatively, the maxUplinkDutyCycle field is reused. Alternatively, a form of the maxUplinkDutyCycle field is used as a configuration constraint, and the constraint may be reported by a terminal or prestored by a network device.

Embodiment 5

In the embodiment 5, the foregoing parameters may be configured based on DRX configuration parameters or be consistent with a DRX configuration. For example, configured periodicity information may be one of a long periodicity set or short periodicity set in the DRX configuration parameters. A long periodicity may be one of [10, 20, 32, 64, . . . , 5120, 10240] (a unit may be a millisecond, slot, or subframe), and a short periodicity may be one of [2, 3, 4, 5, 6, 8, 9, 10, 64, 128, 160, . . . , 640] (a unit may be a millisecond, slot, or subframe). With reference to embodiments of the present invention, a periodicity start location offset parameter may be further introduced as one type of periodicity information. For example, for T to which a parameter in a long periodicity parameter set is set, an offset may be a time start location offset parameter defined by a drx-LongCycleStartOffset field in TS 38.331. For T to which a parameter in a short periodicity parameter set is set, the offset may be a time start position offset parameter defined by drx-ShortCycleStartOffset. A periodicity and start offset parameters may be configured in a manner of parameter configuration of drx-LongCycleStartOffset or drx-ShortCycleStartOffset.

An active number may be configured in another manner. For example, one of one or more sets may be configured. The terminal device and/or the network device may store at least one set, each set is associated with a number of panels or a panel sequence number, and each set includes one or more duration parameters. For example, a set 1 is a duration parameter set when a number of active panels is 1, and includes one of [1, 5, 10, 20, 32, 64 . . . ] (a unit may be millisecond). A set 2 is a duration parameter set when the number of active panels is 2, and includes one of [1, 5, 10, 20, 32, 64 . . . ] (the unit may be millisecond). A set 3 is a duration parameter set when the number of active panels is 3, and includes one of [1, 5, 10, 20, 32, 64 . . . ] (the unit may be millisecond). The set 3 is a duration parameter set when the number of active panels is 4, and includes one of [1, 5, 10, 20, 32, 64 . . . ] (the unit may be millisecond). During specific configuration, a set is directly configured, and then a value in the set is notified of. The terminal receives the value, and may determine the number of active panels and duration based on the value. For example, 20 ms in the set 3 is configured for the terminal, and 20 ms herein may be indicated by using several bits. The terminal activates three antenna panels at a default start moment (for example, a periodicity start location) for 20 ms. Certainly, a specific start time may alternatively be indicated by adding an offset value. Similar to the foregoing manner, the configuration herein may be a specified open panel, or may be a configured maximum number of panels, or a minimum number of panels. Alternatively, a plurality of configurations may be used to configure the three.

It should be understood that, in embodiments of the present invention, because T is a periodicity parameter configuration, configurations of each phase may be interchanged or cyclically shifted. To be specific, one or more phases later in a periodicity and one or more phases earlier in a next periodicity are one phase.

Embodiment 6

The embodiment 6 provides still another parameter design solution. If there is a constraint in a system design, or due to a capability limitation, for example, a hardware indicator or a constraint of a terminal device itself, or other reasons such as an environmental protection index and a radiation index, energy of the terminal may be constant within a periodicity T. There may be a plurality of calculation manners and definitions of "energy" herein. For example, in a manner 1, a specific value may be set for a product of a number of panels activated in a phase and an active duration configuration in the phase, and a configuration in each phase does not exceed the specific value. The phase herein may refer to the periodicity T. In a manner 2, alternatively, a specific value may be set for a sum of a product of a number of panels activated in a plurality of phases in one periodicity T and active duration configurations in the corresponding phases, and a configuration in T does not exceed the specific value. A constraint may be the manner 1, the manner 2, or both. For example, the constraint is that "energy" in the manner 1 is 42. A network device may configure T=20 ms and two phases. If a phase 1 is 1 ms and is associated with activation of 4 panels, and a phase 2 is 19 ms and is associated with activation of 2 panels, "energy" of the two phases in T is 4 and 38 respectively, and each does not exceed 42. Alternatively, T=10 ms and two phases are configured. If a phase 1 is 1 ms and is associated with activation of 4 panels, and a phase 2 is 19 ms and is associated with activation of 2 panels, "energy" of the two phases in T is 2 and 19 respectively, and each does not exceed 42. The constraint is that "energy" in the manner 2 is 42. The network device may configure T=20 ms and two phases. If a phase 1 is 1 ms and is associated with activation of 4 panels, and a phase 2 is 19 ms and is associated with activation of 2 panels, "energy" of T may be a sum of 4 and 38, namely, 42, and does not exceed 42. Alternatively, T=10 ms and two phases are configured. If a phase 1 is 1 ms and is associated with activation of 4 panels, and a phase 2 is 19 ms and is associated with activation of 2 panels, "energy" of T may be a sum of 2 and 19, namely, 21, and does not exceed 42. The constraint is that the "energy" in the manner 1 is 42 and the "energy" in the manner 2 is 42. The network device may configure T=20 ms and two phases. If a phase 1 is 1 ms and is associated with activation of 4 panels, and a phase 2 is 19 ms and is associated with activation of 2 panels, "enemy" of the two phases in T is 4 and 38 respectively, and each does not exceed 42; and a sum of the "energy" of each phase is 42, and does not exceed 42. Alternatively, T=10 ms and two phases are configured. If a phase 1 is 1 ms and is associated with activation of 4 panels, and a phase 2 is 19 ms and is associated with activation of 2 panels, "energy" of the two phases in T is 2 and 19 respectively, and each does not exceed 42 and a sum of the "energy" of each phase is 21, and does not exceed 42, The "energy" herein is merely a name.

It should be understood that, a configuration solution of the network device is used as an example in the foregoing embodiments. Alternatively, the terminal device may report one or more of the configurations in a similar capability reporting manner. For example, one or more transmission proportion configurations may be reported in the embodiment 4. After receiving the report, the network device determines the transmission proportion configuration, and further configures the terminal device. For the embodiment 5, the terminal device may directly report a long periodicity or a short periodicity. Certainly, the terminal device may alternatively report a combination of some long periodicity parameters and some short periodicity parameters.

According to the embodiments, configurations of the terminal device and the network device are more flexible, improving system robustness.

Figure 3:
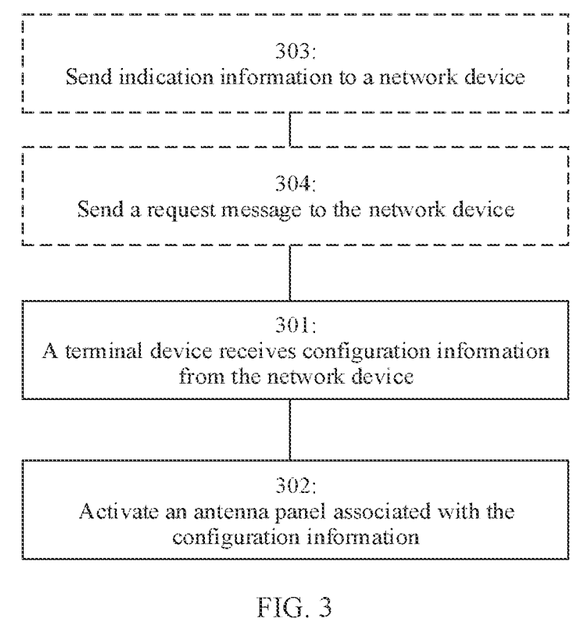
FIG. 3 is a schematic flowchart of a signal transmission method according to an embodiment of this application.

FIG. 3 is a flowchart of a communication method. Specifically, FIG. 3 shows a communication method of a terminal device, including step 301: A terminal device receives configuration information from a network device.

Step 302: The terminal device activates, based on the configuration information, an antenna panel associated with the configuration information.

The configuration information in this embodiment includes a configuration parameter. In an embodiment, step 301 and step 201 are similar. The configuration parameter may be the configuration parameter received in step 201. A receiving process in step 301 may be the implementations in step 201. An activation process in step 302 may be the implementation in step 202. Details are not described herein again. It should be understood that the activation may be consistent with a received configuration.

In an embodiment, before step 302, the method may further include step 303: The terminal device sends indication information to the network device, where the indication information includes one or more service periodicity candidates. The one or more service periodicity candidates may be a set of periodicity parameters supported by a plurality of terminal devices or the terminal device, or may be a plurality of service periodicity candidates selected as needed based on a condition. For a specific manner, refer to step 203. In still another embodiment, before step 301, the method further includes step 304: The terminal device sends a request message to the network device, where the request message triggers the network device to send the configuration information, and trigger of the request message may be implicit. For example, the request message is a piece of preset signaling, and the network device performs step 301 after receiving the configuration signaling. For step 303 and step 304, refer to the step 203 and step 204 respectively or jointly.

According to embodiments of this application, when complexity, power consumption, and heat dissipation of the terminal are acceptable, a solution of using both single-antenna panel transmission and multi-antenna panel transmission can be used, to improve system efficiency. Configuration for the terminal device is flexible, and system robustness is further improved.

Figure 4:
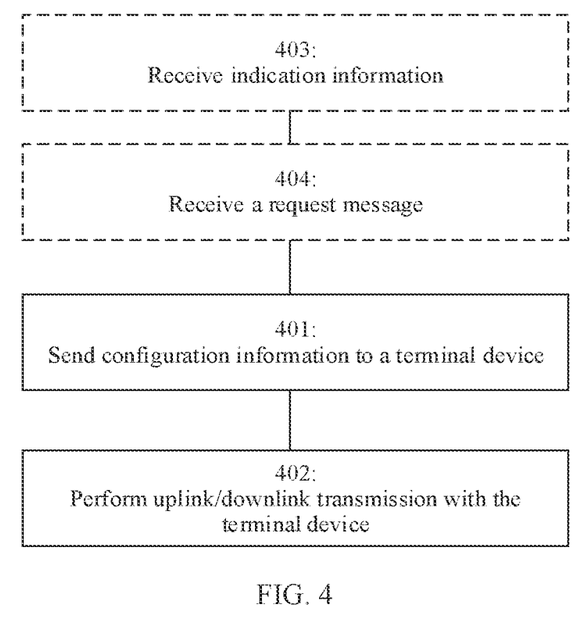
FIG. 4 is a schematic flowchart of a signal transmission method according to an embodiment of this application.

FIG. 4 is a flowchart of a communication method. Specifically, FIG. 4 shows a communication method of a network device, including step 401: A network device sends configuration information to a terminal device, where the configuration information includes service periodicity information of an antenna panel. For this step, refer to step 201 in the embodiment shown in FIG. 2.

Step 402: The network device performs uplink or downlink data transmission with the terminal device. For example, the uplink or downlink data transmission is associated with an antenna panel activated.

Optionally, in an implementation, before step 401, the method further includes step 403: The network device receives indication information, where the indication information includes one or more service periodicity candidates. For details, refer to step 203. It should be understood that, in addition to the embodiment shown in 203, the network device may receive indication information sent by a core network or another base station.

In still another embodiment, before step 401, the method further includes step 404: The network device receives a request message, where the request message triggers the network device to send the configuration information. For details, refer to step 204. It should be understood that the request message or a trigger message herein may alternatively be indication information sent by another network device including a core network device.

According to embodiments of this application, when complexity, power consumption, and heat dissipation of the terminal are acceptable, a solution of using both single-antenna panel transmission and multi-antenna panel transmission can be used, to improve system efficiency. Configuration for the terminal device is flexible, and system robustness is further improved.

The foregoing describes in detail the data transmission method according to embodiments of this application with reference to FIG. 2 to FIG. 4. The following describes in detail a transmission apparatus according to embodiments of this application with reference to FIG. 5 and FIG. 6.

Figure 5:
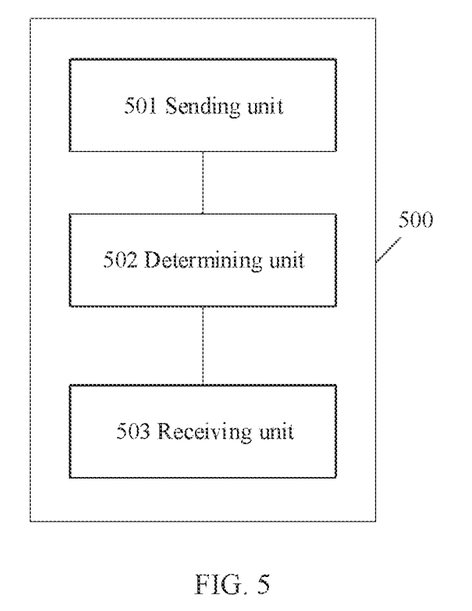
FIG. 5 is a schematic diagram of a transmission apparatus according to an embodiment of this application.

FIG. 5 shows a transmission apparatus 500 according to an embodiment of this application. The apparatus 500 may be a network device and includes:

a sending unit 501 that sends configuration information to a terminal device, where the configuration information includes service periodicity information of an antenna panel;

optionally, a determining unit 502, configured to determine the configuration information, where the configuration information is associated with the terminal device; and optionally, a receiving unit 503. In an embodiment, the receiving unit is configured to receive indication information, where the indication information includes one or more service periodicity candidates. In another embodiment, the receiving unit may receive a request message, where the request message triggers the network device to send the configuration information.

It should be understood that the receiving unit 503 may alternatively be different receiving units. In an embodiment, when the apparatus is a base station, the receiving unit may be an interface, an antenna apparatus, a circuit cable, or another input apparatus. The sending unit may be an antenna, an interface, a circuit cable, or another output apparatus. If the apparatus is a chip apparatus or a storage medium, the receiving unit and the sending unit may be an input and output contact or an output and input module/unit that calculates values internally. The determining unit may be a processor, a processing apparatus, or a processing module. For a specific method performed by the sending unit, refer to step 201, step 301, or step 401. For a specific method step performed by the receiving unit, refer to step 203, step 204, step 303, or step 304.

Figure 6:
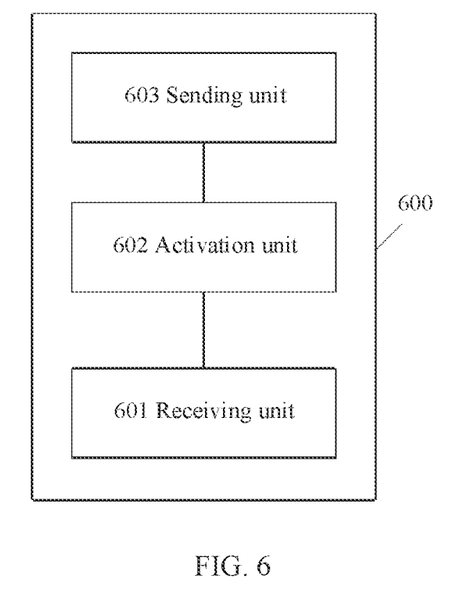
FIG. 6 is a schematic diagram of a transmission apparatus according to an embodiment of this application.

FIG. 6 shows a transmission apparatus 600 according to an embodiment of this application. The apparatus 600 may be a terminal device and includes:

a receiving unit 601 that receives configuration information, where the configuration information includes service periodicity information of an antenna panel; and an activation unit 602 that activates an antenna panel associated with the configuration information. The activation unit may be a processing unit or a processing module; and implements driving, indication, configuration, enabling, and activating an antenna panel, or directly activates an antenna panel independently or in combination with another module.

In an embodiment, the apparatus further includes a sending unit 603. In an embodiment, the sending unit 603 is configured to send indication information to a network device, where the indication information includes one or more service periodicity candidates. In another embodiment, the sending unit 603 is further configured to send a request message, where the request message triggers the network device to send the configuration information.

It should be understood that the receiving unit 601 may alternatively be different receiving units. In an embodiment, when the apparatus is a terminal, the receiving unit may be an interface, an antenna apparatus, a circuit cable, or another input apparatus. The sending unit 603 may be an antenna, an interface, a circuit cable, or another output apparatus. If the apparatus is a chip apparatus or a storage medium, the receiving unit and the sending unit may be an input and output contact or an output and input module/unit that calculates values internally. The determining unit may be a processor, a processing apparatus, or a processing module. For a specific method performed by the activation unit, refer to step 202 and step 302. For a specific method performed by the sending unit, refer to step 203, step 303, step 204, and step 304. For specific method steps performed by the receiving unit, refer to step 201, step 301, step 401, or another related embodiment.

It should be understood that the apparatus may be embodied in a form of a functional unit. The term "unit" herein may refer to an application-specific integrated circuit (application-specific integrated circuit, ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus may be specifically the terminal device in the embodiments, and the apparatus may be configured to perform procedures and/or steps corresponding to the terminal device in the method embodiments. To avoid repetition, details are not described herein again.

Figure 7:
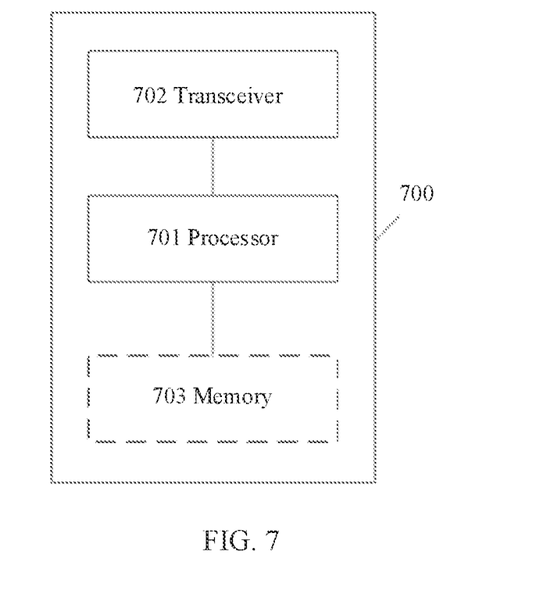
FIG. 7 is a schematic diagram of a transmission apparatus according to an embodiment of this application.

FIG. 7 shows another signal transmission apparatus 700 according to an embodiment of this application. The apparatus 700 includes a processor 701, a transceiver 702, and a memory 703. The processor 701, the transceiver 702, and the memory 703 communicate with each other through an internal connection path. The memory 703 is configured to store instructions, and the processor 701 is configured to execute the instructions stored in the memory 703, to control the transceiver 702 to send a signal and/or receive a signal. It should be understood that some sub apparatuses of 700 may be combined. For example, the instructions in the memory 703 may be integrated into the processor 701. In an embodiment, when the apparatus is a base station or a network device, the transceiver may perform methods and steps such as sending a configuration message, receiving a request message, and receiving trigger information. For details, refer to the execution methods in step 201, step 203, and step 204, or the methods performed in step 401, step 403, and 404. The receiving unit 503 and the sending unit 501 may be the transceiver, and the determining unit 502 may be the processor. In an embodiment, when the apparatus is a terminal, the transceiver may perform methods and steps such as receiving a configuration message, sending a request message, and sending trigger information. For details, refer to the execution methods in step 201, step 203, and step 204, or the methods performed in step 301, step 303, step 304, and the like. The receiving unit 601, the activation unit 602, and the sending unit 603 may be the transceiver. As a terminal apparatus, the transceiver may be the antenna panel, a default antenna panel, or a configured antenna panel. The processor may perform a method in 202 or 302, and an activation process may also involve the transceiver. It should be understood that the processor may be further configured to process received data, determine to-be-sent data, or the like.

The apparatus may further form a system. For example, a terminal apparatus and a network apparatus may form a system. The network apparatus may include components or units in the apparatus embodiments, or perform the method performed by the network device. The terminal apparatus may include components or units in the apparatus embodiments, or perform the method performed by the terminal device.

In an implementation process, the steps in the foregoing methods may be implemented by using a hardware integrated logic circuit in the processor, or by using instructions in a form of software. The steps of the methods disclosed with reference to embodiments of this application may be directly performed by a hardware processor, or may be performed by using a combination of hardware and software units in the processor. A software unit may be located in a mature storage medium in the art, such as a random access memory, a flash memory, a read-only memory, a programmable read-only memory, an electrically erasable programmable memory, or a register. The storage medium is located in the memory, and the processor executes the instructions in the memory and completes the steps in the foregoing method in combination with hardware of the processor. To avoid repetition, details are not described herein again.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

A person of ordinary skill in the art may be aware that, in combination with the examples described in embodiments disclosed in this specification, method steps and units may be implemented by electronic hardware, computer software, or a combination thereof. To clearly describe the interchangeability between hardware and software, the foregoing has generally described steps and compositions of each embodiment according to functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

A person skilled in the art may clearly understand that, for the purpose of convenient and brief description, for detailed working processes of the foregoing system, apparatus, and unit, refer to corresponding processes in the foregoing method embodiments. Details are not described herein again.

In the several embodiments provided in this application, it should be understood that the disclosed systems, apparatuses, and methods may be implemented in other manners. For example, the foregoing apparatus embodiments are merely examples. For example, division of the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate. Parts displayed as units may or may not be physical units, and may be located in one position or may be distributed on a plurality of network units. A part or all of the units may be selected according to actual requirements to achieve the objectives of the solutions of embodiments in this application.

In addition, functional units in embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as a standalone product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a terminal device, configuration information sent by a network device, wherein the configuration information comprises service periodicity information of an antenna panel, and wherein the configuration information comprises phase information in a service periodicity, wherein the phase information indicates a number of phases comprised in the service periodicity, or the phase information indicates proportion information of a preset number of phases; and
   activating, by the terminal device based on the configuration information, an antenna panel associated with the configuration information.

2. The method according to claim 1, wherein the method further comprises:
   sending, by the terminal device, indication information, wherein the indication information comprises one or more service periodicity candidates.

3. The method according to claim 2, wherein the configuration information comprises active number information, and the active number information indicates an active number of antenna panels activated in different phases.

4. The method according to claim 3, wherein the service periodicity information, the phase information, and the active number information are jointly indicated.

5. A communication method, comprising:
   sending, by a network device, configuration information to a terminal device, wherein the configuration information comprises service periodicity information of an antenna panel, and wherein the configuration information comprises phase information in a service periodicity, wherein the phase information indicates a number of phases comprised in the service periodicity, or the phase information indicates proportion information of a preset number of phases; and
   performing, by the network device, uplink or downlink data transmission with the terminal device.

6. The method according to claim 5, wherein the method further comprises:
   receiving, by the network device, indication information, wherein the indication information comprises one or more service periodicity candidates.

7. The method according to claim 6, wherein the configuration information comprises active number information, and the active number information indicates an active number of antenna panels activated in different phases.

8. The method according to claim 7, wherein the service periodicity information, the phase information, and the active number information are jointly indicated.

9. A communication apparatus, comprising:
   at least one processor; and
   one or more memories coupled to the at least one processor and storing programming instructions for execution by the at least one processor to cause the apparatus to:
   receive, configuration information sent by a network device, wherein the configuration information comprises service periodicity information of an antenna panel, and wherein the configuration information comprises phase information in a service periodicity, wherein the phase information indicates a number of phases comprised in the service periodicity, or the phase information indicates proportion information of a preset number of phases; and
   activate, based on the configuration information, an antenna panel associated with the configuration information.

10. The communication apparatus according to claim 9, wherein the programming instructions, when executed by the at least one processor, cause the apparatus to send indication information, wherein the indication information comprises one or more service periodicity candidates.

11. The communication apparatus according to claim 10, wherein the configuration information comprises active number information, and the active number information indicates an active number of antenna panels activated in different phases.

12. The communication apparatus according to claim 11, wherein the service periodicity information, the phase information, and the active number information are jointly indicated.

13. The communication apparatus according to claim 9, wherein the communication apparatus is a terminal device.

14. The communication apparatus according to claim 9, wherein the communication apparatus is a chip.

15. A communication apparatus, comprising:
   at least one processor; and
   one or more memories coupled to the at least one processor and storing programming instructions for execution by the at least one processor to cause the apparatus to:
   send configuration information to a terminal device, wherein the configuration information comprises service periodicity information of an antenna panel, and wherein the configuration information comprises phase information in a service periodicity, wherein the phase information indicates a number of phases comprised in the service periodicity, or the phase information indicates proportion information of a preset number of phases; and
   determine the configuration information.

16. The communication apparatus according to claim 15, wherein the programming instructions, when executed by the at least one processor, cause the apparatus to receive indication information, wherein the indication information comprises one or more service periodicity candidates.

17. The communication apparatus according to claim 16, wherein the configuration information comprises active number information, and the active number information indicates an active number of antenna panels activated in different phases.

18. The communication apparatus according to claim 17, wherein the service periodicity information, the phase information, and the active number information are jointly indicated.

19. The communication apparatus according to claim 15, wherein the communication apparatus is a network device.

20. The communication apparatus according to claim 15, wherein the communication apparatus is a chip.

* * * * *